Figure 1:
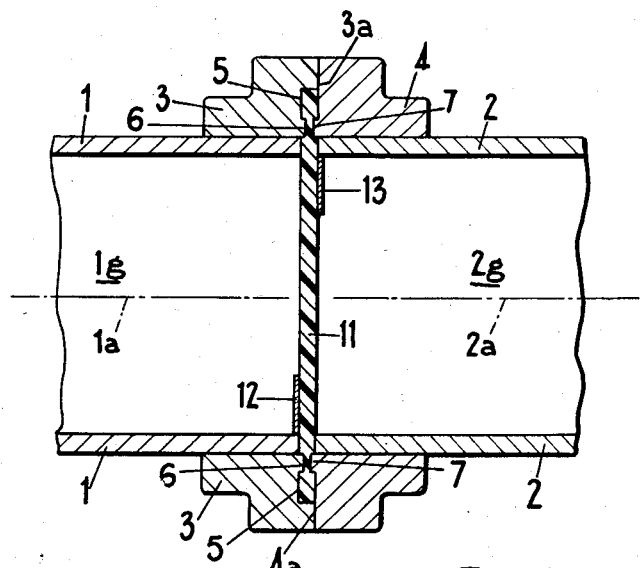

March 22, 1960

A. S. WALSH 2,930,008

WAVEGUIDE ARRANGEMENTS INCLUDING WINDOWS
FOR PASSING ELECTROMAGNETIC WAVES

Filed July 5, 1956

2 Sheets-Sheet 1

INVENTOR
ARTHUR STEPHEN WALSH

BY
Fischstein, Fischstein & Ottinger
ATTORNEYS

United States Patent Office 2,930,008
Patented Mar. 22, 1960

2,930,008

WAVEGUIDE ARRANGEMENTS INCLUDING WINDOWS FOR PASSING ELECTROMAGNETIC WAVES

Arthur Stephen Walsh, Bushey, England, assignor to The General Electric Company Limited, London, England Application July 5, 1956, Serial No. 596,013

Claims priority, application Great Britain July 7, 1955

15 Claims. (Cl. 333—98)

The present invention relates to waveguide arrangements including windows for passing electromagnetic waves.

Such waveguide arrangements may be employed when it is required to couple a waveguide or a cavity to another waveguide or cavity, and it is one object of the present invention to provide an improved arrangement to enable such coupling to be effected.

According to one aspect of the present invention a waveguide arrangement including a window for passing electromagnetic waves, comprises a first waveguide, a second waveguide similar in cross-section to said first waveguide, means adapted to position one end of said first waveguide adjacent to, and separated by a gap from, one end of said second waveguide such that at said one end of said first waveguide said first waveguide is substantially in alignment with said second waveguide at said one end thereof, a window member composed, at least in part, of dielectric material and adapted to be positioned in said gap such that, in operation, electromagnetic waves may pass to said second waveguide from said first waveguide through a portion of said window member, said portion being composed substantially or entirely of dielectric material, and a choke, formed, at least, when said one end of said first waveguide is positioned adjacent to, and separated by said gap from said one end of said second waveguide, which is adapted such that, in operation, that choke serves to reduce any loss, due to said gap, of electromagnetic wave energy between said first waveguide and said second waveguide, the dielectric of said choke being formed, at least in part, by a further portion of said window member, said further portion being composed substantially or entirely of dielectric material.

The term "waveguide" is used in the present specification to refer to a guide for electromagnetic waves, but does not include the guide for electromagnetic waves provided by the so-called wire waveguide, or a surface wave transmission line, along which energy is transmitted by way of electric and magnetic fields surrounding an electric conductor or conducting surface.

According to another aspect of the present invention a waveguide arrangement including a window for passing electromagnetic waves, comprises a first member having a first waveguide defined therein, a second member having a second waveguide, similar in cross-section to said first waveguide, defined therein, said first member and said second member being arranged to be coupled together such that, at one end of said first waveguide, said first waveguide is in alignment with said second waveguide at one end thereof and such that one end of said first waveguide lies adjacent to said one end of said second waveguide, said first member and said second member when so coupled together being adapted to define a cavity situated between said one end of said first waveguide and said one end of said second waveguide such that said one end of said first waveguide is separated by a gap from said one end of said second waveguide, said cavity having walls which define a choke which, in operation, tends to reduce any loss, due to said gap, of electromagnetic wave energy between said first waveguide and said second waveguide, and a window member formed of dielectric material which is arranged to lie in said cavity such that said gap is filled entirely by a portion of said window member and that the dielectric of said choke is formed by a further portion of said window member.

According to a further aspect of the present invention a waveguide arrangement including a window for passing electromagnetic waves, comprises two similar window arrangements each comprising a first member having a first waveguide defined therein, a second member having a second waveguide, similar in cross-section to said first waveguide, defined therein, said first member and said second member being arranged to be coupled together such that, at one end of said first waveguide, said first waveguide is in alignment with said second waveguide at one end thereof, and such that one end of said first waveguide lies adjacent to said one end of said second waveguide, said first member and said second member when so coupled together being adapted to define a cavity situated between said one end of said first waveguide and said one end of said second waveguide such that said one end of said first waveguide is separated by a gap from said one end of said second waveguide, said cavity having walls which define a choke which, in operation, tends to reduce any loss, due to said gap, of electromagnetic wave energy between said first waveguide and said second waveguide, and a window member formed of dielectric material which is arranged to lie in said cavity such that said gap is filled entirely by a portion of said window member and that the dielectric of said choke is formed by a further portion of said window member, and, in addition, means for coupling said second waveguide in one of said window arrangements to said second waveguide in the other of said window arrangements, the waveguide arrangement being such that electromagnetic waves may pass, in operation, from said first waveguide in one of said window arrangements to said first waveguide in the other of said window arrangements through said window member and said second waveguide in each of said window arrangements, without substantial loss of energy therefrom.

Figure 2:
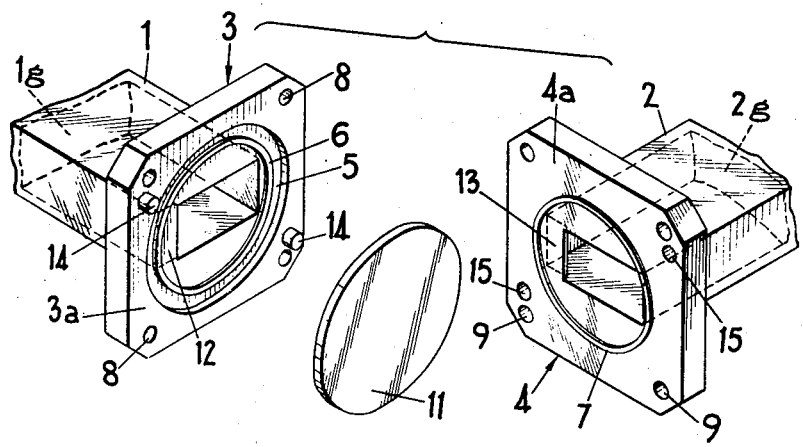
Figure 3:
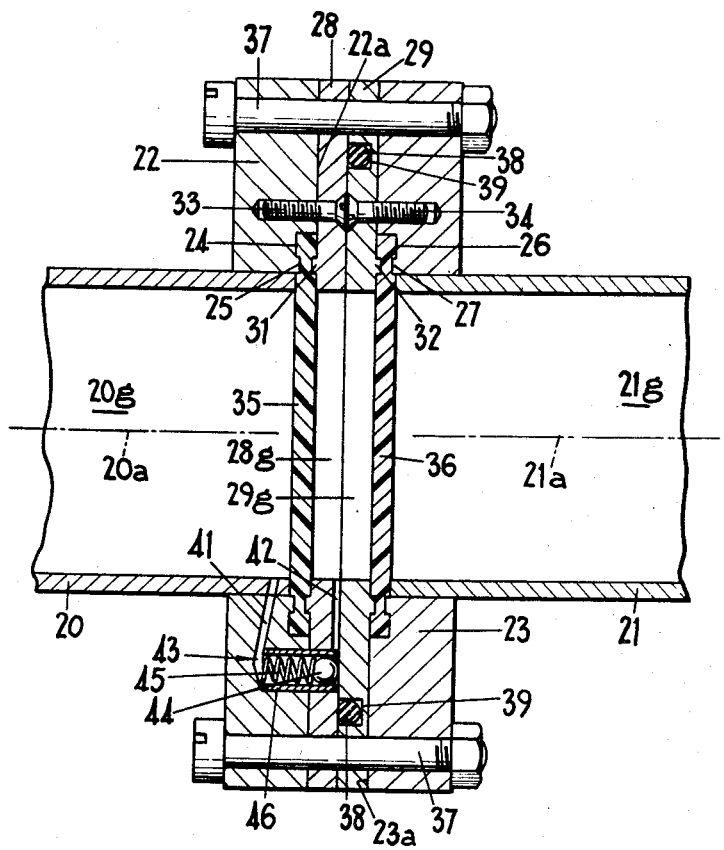

Two constructions of waveguide arrangements according to the present invention will now be described, by way of example, with reference to the accompanying drawings in which:

Figure 1 is a plan view, in section, of a first of the two waveguide arrangements, Figure 2 is a perspective view of the component parts of the arrangement shown in Figure 1, and Figure 3 is a plan view, in section, of the second of the two waveguide arrangements.

The term "waveguide section," as used hereinafter, is used to refer to a tube the inside of which forms a waveguide (in the sense in which the term "waveguide" has previously been used in this specification). A waveguide section is frequently formed, for example, by a length of metal tubing, usually brass, which has either a square or rectangular cross-section.

Referring to Figure 1, a waveguide section 1, having a waveguide 1g passing therethrough, is arranged to lie with the longitudinal axis 1a thereof colinear with the longitudinal axis 2a of a waveguide section 2 which has a waveguide 2g passing therethrough. The cross-sections, which are rectangular, of each of the waveguides 1g and 2g are of dimension 1.122 inch x 0.497 inch.

A flange member 3 is secured to one end of the waveguide section 1 and a flange member 4 is secured to one end of the waveguide section 2.

The flange member 3 has a cylindrical recess 5 in one face 3a thereof, the recess 5 having a depth of 0.062 inch and a diameter of 1.597 inch, the axis thereof being coincident with the axis 1a. An annular projection 6 is formed at the bottom of the recess 5, the projection 6 projecting from the bottom of the recess 5 by 0.005 inch. The internal and external diameters of the projection 6 are 1.280 inch and 1.320 inch respectively, and the centre thereof lies on the axis 1a.

The flange member 4 has one face 4a thereof upon which there is formed an annular projection 7 which is similar to the projection 6, projecting from the face 4a by 0.005 inch.

The flange member 3 is clamped to the flange member 4, with the face 3a abutting the face 4a, by means of four bolts (not shown) which pass through holes 8 and 9 (some only of which are indicated) in the flange members 3 and 4 respectively.

Before the flange members 3 and 4 are clamped together, a disc 11, of polytetrafluorethylene, is inserted into the cylindrical recess 5, the disc 11 having a diameter which is the same as that of the recess 5 and a thickness of 0.063 inch. The space between the face 4a of the flange member 4 and the bottom of the recess 5 in the flange member 3 is completely filled by the disc 11 when the flange members 3 and 4 are clamped together. The annular projections 6 and 7 on the flange members 3 and 4 bite into the polytetrafluorethylene disc 11, and thus there is effectively provided a gas-tight seal between the waveguide 1g in the waveguide section 1, and the waveguide 2g in the waveguide section 2.

The disc 11 is preferably manufactured from a circular blank of polytetrafluorethylene which has a thickness of $\frac{1}{16}$ inch, and a diameter which is between 1.598 inch and 1.601 inch, that is, from 0.001 inch to 0.004 inch oversize, the blank then being compressed to the required dimensions. In this way the required disc 11 may be efficiently manufactured with an accuracy of ±0.005 inch.

A diaphragm 12 which consists of a thin rectangular metallic plate of dimensions 0.497 inch x 0.160 inch x 0.028 inch, is situated at one end of the waveguide 1g.

A diaphragm 13, similar to the diaphragm 12, is situated at one end of the waveguide 2g, the positioning of the diaphragm 13 within the waveguide 2g being similar to the positioning of the diaphragm 12 in the waveguide 1g.

The diaphragms 12 and 13 together form an inductive iris, with one part thereof lying on one side of the polytetrafluorethylene disc 11 and with the other part thereof lying on the other side of the disc 11. The impedance of this iris is inductive, and substantially matches out the capacitative impedance of the polytetrafluorethylene disc 11 at the operational frequency of the arrangement which is in the region of 8,750 megacycles per second.

Since it is required that the waveguides 1g and 2g should be in alignment, and also that the diaphragms 12 and 13 should be accurately positioned with respect to one another, when the flange members 3 and 4 are clamped together, two dowel pins 14 are fitted to the flange member 3 which co-operate with two holes 15 in the flange member 4 when this requirement is satisfied.

The gap between the waveguides 1g and 2g is choked by a dielectric-filled half-wavelength radial choke formed by the recess 5 between the flange members 3 and 4, this choke being completely filled with the dielectric material, polytetrafluorethylene, of the disc 11. In view of the fact that this choke is formed between the flange members 3 and 4, it is essential that the faces 3a and 4a should be accurately machined so that when these are clamped together they make good electrical contact, particularly around the edge of the cylindrical recess 5.

One waveguide arrangement, constructed as described above with reference to Figures 1 and 2, provides a gas-tight seal between the waveguide sections 1 and 2 which will withstand a pressure difference across the seal of over two atmospheres over a temperature range of −60° C. to +85° C., and will handle 250 kilowatts peak, and 250 watts mean, radio frequency power, over that range. The voltage standing wave ratio for this arrangement over the frequency range of 8,300 megacycles per second to 9,600 megacycles per second is greater than 0.95.

Referring now to Figure 3, a waveguide section 20, having a waveguide 20g passing therethrough, is arranged to lie with the longitudinal axis 20a thereof, colinear with the longitudinal axis 21a of a waveguide section 21 which has a waveguide 21g passing therethrough. The cross-sections, which are rectangular, of each of the waveguides 20g and 21g are of dimension 1.122 inch x 0.497 inch.

A flange member 22 is secured to the waveguide section 20, and a flange member 23 is secured to the waveguide section 21. Each of the flange members 22 and 23 consists of a circular metal plate having a thickness of 0.350 inch and a diameter of 2.800 inch.

A cylindrical recess 24 is formed in a face 22a of the flange member 22, the dimensions of the recess 24 being the same as those of the cylindrical recess 5 in the arrangement described with reference to Figures 1 and 2, the axis of the recess 24 lying along the axis 20a. An annular projection 25 is formed at the bottom of the cylindrical recess 24, the projection 25 projecting from the bottom of the recess 24 by 0.005 inch. The internal and external diameters of the annular projection 25 are 1.280 inch and 1.320 inch respectively, and the centre thereof lies on the axis 20a.

The flange member 23 is identical in form to the flange member 22, having a recess 26 and an annular projection 27 which are identical to the recess 24 and the projection 25 respectively. The longitudinal axis of the recess 26 lies along, and the centre of the projection 27 lies on, the axis 21a.

Two circular metal plates 28 and 29, each having a thickness of 0.16 inch and a diameter equal to that of the flange members 22 and 23, are provided. The plate 28 has, formed on one face 28a thereof, an annular projection 31 which is exactly the same as the projection 25 and the projection 27 formed on the flange members 22 and 23 respectively. The centre of the annular projection 25 lies at the centre of the face 22a. In addition a rectangular hole 28g passes through the centre of the plate 22, the dimensions of the cross-section of the hole 28g being the same as the dimensions of the cross-section of each of the waveguides 20g and 21g.

The plate 29 is similar in form to the plate 28, having an annular projection 32 and a hole 29g which are identical in dimensions to the projection 31 and the hole 28g.

The plate 28 is secured to the face 22a of the flange member 22 by means of six screws 33 (of which only one is shown) which pass through the plate 28 into the flange member 22 so that the rectangular hole 28g is in alignment with the waveguide 20g. In a similar manner the metal plate 29 is secured to the flange member 23 with the hole 29g in alignment with the waveguide 21g by means of six screws 34 (of which only one is shown).

Before the metal plates 28 and 29 are clamped to the flange members 22 and 23 respectively, a disc 35, of polytetrafluorethylene, is inserted into the cylindrical recess 24 and a disc 36, also of polytetrafluorethylene, is inserted in the recess 26. The discs 35 and 36 are similar to the disc 11 in the arrangement described with reference to Figures 1 and 2. The projections 25 and 31, and the projections 27 and 32 bite into the discs 35 and 36 respectively, when the plates 28 and 29 are clamped to the flange members 22 and 23.

The plates 28 and 29, secured to the flange members 22 and 23 respectively, are clamped together by means of four bolts 37 (of which only two are shown) with the holes 28g and 29g in alignment. In order that the junction between the plates 28 and 29 should provide a gas-tight seal, the plates 28 and 29 are accurately machined to obtain good surface contact and a synthetic rubber sealing ring 38 is provided, this ring fitting into an annular groove 39 in the plate 29.

The breaks in the waveguide system between the waveguide sections 20 and 21, that is the gap between the flange member 22 and the plate 28, and the gap between the flange member 23 and the plate 29, are choked by dielectric-filled half-wavelength radical chokes formed in part by the cylindrical recesses 24 and 26 respectively.

Due to the relative positioning of the discs 35 and 36, that is, at a distance apart which is equal to, or approximately equal to, an odd integral multiple of a quarter of the operational wavelength, the capacitative impedance of each of these is matched out by that of the other. Therefore the construction of the arrangement is simplified in that no means, such as an inductive iris, is required to provide the required matching out of the reactive impedance of each of the discs 35 and 36.

The arrangement shown in Figure 3 is for use in a waveguide system wherein pressurisation of that system is employed, and since it will be desirable that the holes 28g and 29g should be pressurised also when the arrangement is assembled as shown in Figure 3, passages 41 and 42 are provided to effect this. A simple ball valve 43, comprising a ball 44 and spring 45 fitted into a housing 46, is fitted into the flange member 22 and the plate 28, connecting the passages 41 and 42. When the plates 28 and 29 are clamped together by the bolts 37, the ball valve 43 is open, the ball 44 being pushed from its seating in the housing 46 by the plate 29 against the action of the spring 45, and connects the waveguide 20g to the holes 28g and 29g by means of the passages 41 and 42. However, when the plate 28 is not clamped to the plate 29, during, for example the unclamping of the waveguide sections 20 and 21 from each other, the ball 44 is held in its seating in the housing 46 by the spring 45, and, therefore, the ball valve 44 seals the passage 41 thereby maintaining the pressurisation of the waveguide 20g.

Hence the pressurisation of the system of which the arrangement shown in Figure 3 forms part, will be maintained even if the waveguide section 20 is uncoupled from the waveguide section 21, since the waveguides 20g and 21g are individually sealed.

If it is not necessary that both waveguides 20g and 21g should remain individually sealed when these are uncoupled, a small hole (not shown) may be provided in one or both of the polytetrafluorethylene discs 35 or 36, instead of providing the passages 41 and 42 with the ball valve 43.

One waveguide arrangement constructed as described above with reference to Figure 3 provides a gas-tight seal between the waveguide sections thereof which will withstand a pressure difference across the seal of over two atmospheres over a temperature range of −60° C. to +85° C., however, it is necessary in this case to ensure that the synthetic rubber sealing ring 38 is suitable for this temperature range. The power handling capacity of the arrangement is up to one megawatt peak radio frequency power, and the voltage standing wave ratio over a range of frequencies from 8,400 megacycles per second to 9,300 megacycles per second is greater than 0.9.

Although, in the two examples described above with reference to the accompanying drawings, the discs 11, 35 and 36 are made of polytetrafluorethylene, another suitable material which may be used is polythene; however, the use of polytetrafluorethylene is preferred since the temperature range over which it provides an efficient seal is greater than that for polythene.

I claim:

1. A waveguide arrangement including a window for passing electromagnetic waves, comprising a first member having a first waveguide defined therein, a second member having a second waveguide similar in cross-section to said first waveguide defined therein, said first member and said second member being constructed to define a cavity situated between one end of said first waveguide and one end of said second waveguide, said first and second members further being constructed to be coupled together with said first waveguide in alignment with said second waveguide and with said one end of said first waveguide lying adjacent to, but due to said cavity separated by a gap from, said one end of said second waveguide, and a plate-like dielectric window member which is arranged to lie in said cavity and close said ends so that said gap is filled entirely by a portion of said window member, said cavity having walls which define a choke extending wholly radially from the peripheries of the adjacent ends of said first and said second waveguides by a distance substantially equal to $n$ half wavelengths of said waves in said cavity, where $n$ is an integral number, to reduce any loss due to said gap of electromagnetic wave energy between said first waveguide and said second waveguide.

2. A waveguide arrangement including a window for passing electromagnetic waves, comprising a first member having a first waveguide defined therein, a second member having a second waveguide similar in cross-section to said first waveguide defined therein, said first member and said second member being constructed to define a cavity situated between one end of said first waveguide and one end of said second waveguide, said first and second members further being constructed to be coupled together with said first waveguide in alignment with said second waveguide and with said one end of said first waveguide lying adjacent to, but due to said cavity separated by a gap from, said one end of said second waveguide, and a plate-like dielectric window member which is arranged to fill said cavity and close said ends so that said gap is filled entirely by a portion of said window member, said cavity having walls which define a choke extending wholly radially from the peripheries of the adjacent ends of said first and said second waveguides by a distance substantially equal to half the wavelength of said waves in the dielectric window member to reduce any loss due to said gap of electromagnetic wave energy between said first waveguide and said second waveguide.

3. A waveguide arrangement according to claim 2 wherein at least one projection is provided in said cavity to bite into said window member.

4. A waveguide arrangement according to claim 3 wherein said window member is composed entirely of polytetrafluorethylene.

5. A waveguide arrangement according to claim 3 wherein said window member is composed entirely of polythene.

6. A waveguide arrangement according to claim 3 wherein said window member provides a gas-tight seal between said first waveguide and said second waveguide.

7. A waveguide arrangement according to claim 2 wherein matching means is provided which is adapted to at least tend to match out the reactive impedance presented by said window member to electromagnetic waves propagated between said first waveguide and said second waveguide in operation.

8. A waveguide arrangement according to claim 7 wherein the reactive impedance of said window member is at least approximately matched out by the positioning of a further window member similar to the first-mentioned window member at an appropriate distance along said second waveguide from said first-mentioned window member.

9. A waveguide arrangement including a window for passing electromagnetic waves, comprising a first member having a first waveguide defined therein, a second member having a second waveguide similar in cross-section to said first waveguide defined therein, said first member and said second member being constructed to define a cavity situated between one end of said first waveguide and one end of said second waveguide, said first and second members further being constructed to be coupled together with said first waveguide in alignment with said second waveguide and with said one end of said first waveguide lying adjacent to, but due to said cavity separated by a gap from, said one end of said second waveguide, said cavity having walls which define a choke extending wholly radially from the peripheries of the adjacent ends of said first and second waveguides to reduce any loss due to said gap of electromagnetic wave energy between said first waveguide and said second waveguide, a plate-like dielectric window member which is arranged to lie in said cavity and close said ends so that said gap is filled entirely by a portion of said window member and so that the dielectric of said choke is formed by a further portion of said window member, and two diaphragms which are arranged to at least tend to match out the reactive impedance presented by said window member to electromagnetic waves propagated between said first waveguide and said second waveguide, one of the diaphragms lying at said one end of said first waveguide and the other at said one end of said second waveguide.

10. A waveguide arrangement including a window for passing electromagnetic waves, comprising two similar window arrangements each of which comprises a first member having a first waveguide defined therein, a second member having a second waveguide similar in cross-section to said first waveguide defined therein, said first member and said secod member being constructed to define a cavity situated between one end of said first waveguide and one end of said second waveguide, said first and second members further being constructed to be coupled together with said first waveguide in alignment with said second waveguide and with said one end of said first waveguide lying adjacent to, but due to said cavity separated by a gap from, said one end of said second waveguide, and a plate-like dielectric window member which is arranged to fill said cavity and close said ends so that said gap is filled entirely by a portion of said window member, said cavity having walls which define a choke extending wholly radially from the peripheries of the adjacent ends of said first and said second waveguides by a distance substantially equal to half the wavelength of said waves in the dielectric window member to reduce any loss due to said gap of electromagnetic wave energy between said first waveguide and said second waveguide and, in addition, means for coupling said second waveguide in one of said window arrangements to said second waveguide in the other of said window arrangements, the waveguide arrangement being such that electromagnetic waves may pass, in operation, from said first waveguide in one of said window arrangements to said first waveguide in the other of said window arrangements through said window member and said second waveguide in each of said window arrangements, without substantial loss of energy therefrom.

11. A waveguide arrangement according to claim 10 wherein the reactive impedance of said window member in each of said window arrangements is matched out by that of said window member in the other of said window arrangements.

12. A waveguide arrangement according to claim 10 wherein said window member in at least one of said window arrangements is formed of polytetrafluorethylene.

13. A waveguide arrangement according to claim 10 wherein said window member in at least one of said window arrangements is formed of polythene.

14. A waveguide arrangement according to claim 10 wherein at least one projection is provided in said cavity in each of said window arrangements, which is adapted to bite into said window member in that window arrangement.

15. A waveguide arrangement according to claim 14 wherein said window member in one of said window arrangements provides a gas-tight seal between said first waveguide and said second waveguide in that arrangement.

References Cited in the file of this patent

UNITED STATES PATENTS

| | | |
|---|---|---|
| 2,473,724 | Okress et al. | June 21, 1949 |
| 2,473,834 | Tuller | June 21, 1949 |
| 2,501,335 | Hunter | Mar. 21, 1950 |
| 2,636,926 | Wilson | Apr. 28, 1953 |
| 2,788,498 | Hardway | Apr. 9, 1957 |
| 2,831,047 | Wadey | Apr. 15, 1958 |